2,983,723
ISONOVOBIOCIN AND ISOMERIZATION THEREOF

Edgar Louis Caron, Kalamazoo, James L. Johnson, Portage Township, Kalamazoo County, Jack W. Hinman, Kalamazoo, and Herman Hoeksema, Kalamazoo Township, Kalamazoo County, Mich., assignors to The Upjohn Company, Kalamazoo, Mich., a corporation of Michigan No Drawing. Filed July 17, 1957, Ser. No. 672,373

8 Claims. (Cl. 260—210)

This invention relates to a novel compound and to a novel process for preparing the same.

Novobiocin, 7-[4-(carbamoyloxy)-3-hydroxy-5-methoxy-6,6-dimethylpyran-2-yloxy]-4-hydroxy-3-[4-hydroxy-3-(3-methyl-2-butenyl)benzamido]-8-methylcoumarin, is a new antibiotic having the structural formula:

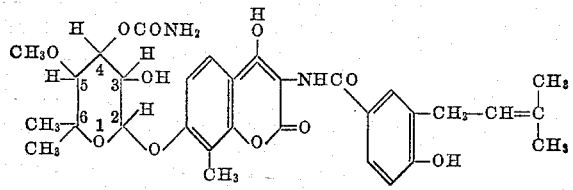

J. Am. Chem. Soc. 78, 1770–1 (1956); ibid 78, 2019–20 (1956).

It has been found that crude novobiocin crystals obtained from fermentation beer contains a substantial quantity of an inactive component, more particularly so if the novobiocin has been brought into contact with alkali, especially at about pH 10, in the recovery process. This inactive component has been shown to be an isomer of novobiocin in which the carbamyl group is in the 3-position instead of the 4-position. This inactive isomer has been named isonovobiocin, 7-[3-(carbamoloxy)-3-hydroxy-5-methoxy-6,6-dimethylpyran-2-yloxy]-4-hydroxy-3-[4-hydroxy-3-(3-methyl-2-butenyl) benzamido]-8-methylcoumarin.

It has also been found that isonovobiocin can be converted to novobiocin by treatment with aqueous alkali. This invention, therefore, is useful in that the biologically inactive isonovobiocin produced in the recovery of novobiocin, or otherwise, can be converted to the biologically active novobiocin.

Novobiocin in its fermentation beers and in aqueous alkaline solutions, especially at about pH 10, rapidly degrades to about two-thirds of the original activity. It has been found in accordance with this invention that this degradation is due to the conversion of novobiocin to isonovobiocin which, except for the biological activity, has properties so similar to novobiocin that the two are difficult to separate. Separation of the two isomers, however, can be effected by the Craig distribution technique.

From a practical standpoint, complete separation of isonovobiocin from novobiocin is not necessary to obtain a useful product. For example, washing of crude novobiocin crystals with aqueous acetone at a concentration of about 55 to about eighty volume percent, advantageously at about sixty volume percent (1.5 volumes of acetone to one of water equals sixty percent), selectively washes out the insonovobiocin. Products containing a high ratio of isonovobiocin to novobiocin, up to about two or more parts of isonovobiocin for each part of novobiocin, can be obtained in this way. On addition to such wash waters of sodium hydroxide or other water soluble alkalies such as sodium carbonate, potassium hydroxide, and potassuim carbonate, or by dissolving the product recovered from the wash waters in aqueous alkali, and allowing the wash waters, or resulting solution, to stand at about pH 10, conversion of isonovobiocin to novobiocin is obtained.

It has been shown that either novobiocin or isonovobiocin in aqueous solution at about pH 10 is converted to an equilibrium mixture containing about two parts novobiocin to one part isonovobiocin. Thus, in accordance with this invention any product containing greater than 0.5 part of isonovobiocin for each part of novobiocin is useful in that the isonovobiocin therein can be converted to novobiocin in the proportion that the isonovobiocin to novobiocin ratio exceeds 0.5.

In the alkaline conversion of the isonovobiocin to novobiocin using such nonequilibrium mixtures, or using isolated isonovobiocin, the isonovobiocin is simply allowed to stand in an aqueous alkaline solution until the desired isomerization is effected. Advantageously, the pH of the solution is maintained at about pH 10. It is understood, however, that higher or lower pH can be used but that ordinarily, the rate of isomerization at a pH less than pH 9.5 is too slow and excessive degradation may result if the pH is greater than about pH 11.0. It will ordinarily be sufficient to allow the solution to stand at room temperature (about 25 degrees centigrade) although higher or lower temperatures can be used. Ordinarily, however, at temperatures below 15 degrees centigrade the rate of isomerization is too slow and at a temperature above about 35 degrees centigrade excessive degradation may result.

The equilibrium or near equilibrium mixture obtained by isomerization of isonovobiocin can be utilized as such, where impure grades of novobiocin are desired, or can be upgraded by crystallizing out the novobiocin followed by washing the crystals, if desired, with sixty volume percent aqueous acetone. The novobiocin crystals obtained can be further purified by recrystallization in accordance with the usual procedures.

The invention may be more fully understood by the following examples which are not to be construed as limiting but only as illustrative. Parts and percentages are by weight unless otherwise specified.

*Example 1.—Conversion of isonovobiocin to novobiocin and isolation of the novobiocin*

(A) To a solution of 6.2 kilograms of novobiocin and 13.9 kilograms of isonovobiocin in 270 gallons of sixty volume percent aqueous acetone was added 3.2 kilograms of sodium hydroxide dissolved in 100 gallons of water to adjust the pH to pH 10. After standing at this pH and at 25 degrees centigrade for two hours, a solution containing 13.4 kilograms of novobiocin and 6.7 kilograms of isonovobiocin was obtained.

(B) On acidifying the solution thus obtained to pH 1.5, adding 20 gallons of acetone, to dissolve any undissolved material, and seeding with crystals of novobiocin, novobiocin crystals containing at least 90 percent of novobiocin are obtained. These crystals can be further purified by recrystallization from acetone-water mixtures in accordance with known practices for recrystallizing novobiocin.

The novobiocin crystals thus obtained can be converted into the sodium and calcium salts or hydrogenated to dihydronovobiocin in accordance with procedures known in the art for converting novobiocin to these products.

*Example 2.—Concentration of a mixture of 79 percent novobiocin and 21 percent isonovobiocin to 37 percent novobiocin and 63 percent isonovobiocin*

A 19.5-gram portion of material which assayed 79 percent novobiocin was dissolved in 200 milliliters of 60 percent aqueous acetone and seeded with novobiocin acid. Three crops of novobiocin crystals ranging from 90 to 98 percent pure by biological assay, and totaling 9.2 grams, were collected. The filtrate from this procedure was evaporated to 175 milliliters, then diluted with water to 250 milliliters, and refrigerated sixteen hours. The oily precipitate so obtained was separated, washed with water, and dried under vacuum. It weighed 5.4 grams. (The rather large loss which occured was mechanical.) It assayed 37 percent novobiocin and 53 percent isonovobiocin (37 percent bioactivity; 90 percent U.V. activity), and was separated in a Craig countercurrent distribution into novobiocin and isonovobiocin.

The 37 percent novobiocin and 53 percent isonovobiocin mixture of this example is suitable for use as starting material in Example 1.

*Example 3.—Isolation of isonovobiocin*

(A) To a solution of 20 grams of novobiocin in 200 milliliters of 95 percent ethanol was added 16 milliliters of 2 N sodium hydroxide solution, 1400 milliliters of water, and a second 16 milliliter portion of 2 N sodium hydroxide solution to adjust the pH to pH 10. After standing at this pH and at 25 degrees centigrade for two hours a solution containing 13.4 grams of novobiocin in equilibrium with 6.6 grams of isonovobiocin was obtained.

(B) Upon acidifying the solution thus obtained to pH 2 by the rapid addition of 6 N hydrochloric acid solution a precipitate of novobiocin-isonovobiocin equilibrium mixture weighing 19.5 grams and containing 13.0 grams of novobiocin and 6.5 grams of isonovobiocin was obtained.

(C) A 2.37-gram sample of the novobiocin-isonobiocin equilibrium mixture thus obtained was subjected to an 1800 transfer counter-current distribution between the solvent pair obtained by combining water, acetone, methyl ethyl ketone, and Skellysolve B (technical n-hexane) in the proportions of 3:9:2:6 parts by volume, using an automatic 200 tube machine. Analysis of the distribution curve indicated the isonovobiocin to have moved with a distribution coefficient of 1.43, the novobiocin to have moved with a distribution coefficient of 1.27, essentially pure isonovobiocin to be contained within tubes 50 to 110 of the distribution machine, essentially pure novobiocin to be contained within tubes 150 to 199 and 0 to 25, and a mixture of novobiocin and isonovobiocin to be contained within tubes 26 to 49. The contents of tubes 50 to 110 were combined and the solution so obtained was distilled in vacuo to obtain a mixture of water and isonovobiocin as a gummy precipitate. Upon extracting this mixture with 75 milliliters of ethyl acetate and again with fifty milliliters of ethyl acetate, drying the combined extract over anhydrous magnesium sulfate and distilling off the ethyl acetate solvent in vacuo an amorphous residue weighing 286 milligrams and containing isonovobiocin substantially pure was obtained.

*Analysis.*—Calcd. for $C_{31}H_{36}N_2O_{11}$: C, 60.77; H, 5.92; N, 4.57. Found: C, 59.99; H, 6.28; N, 4.43.

The infrared absorption spectrum of isonovobiocin thus obtained is essentially indistinguishable from that of amorphous novobiocin, as is the ultraviolet absorption spectrum. The antibiotic activity as measured by routine assay procedures for novobiocin was not more than 14 percent of that of pure novobiocin.

Isonovobiocin as obtained by the procedures described in this example can be degraded to 2-O-carbamyl-4-O-methyl-5,5-dimethyl-L-lyxose, which fails to be oxidized by periodic acid. Novobiocin when subjected to the same degradation yields 3 - O - carbamyl-4-O-methyl-5,5-dimethyl-L-lyxose, which consumes one mole of periodic acid per mole of substrate.

It is to be understood that the invention is not to be limited to the exact details of operation or exact compounds shown and described herein, as obvious modifications and equivalents will be apparent to one skilled in the art, and the invention is therefore to be limited only by the scope of the appended claims.

We claim:

1. Isonovobiocin essentially free of novobiocin.

2. Isonovobiocin containing less than two parts novobiocin for each part of isonovobiocin.

3. A composition of matter containing isonovobiocin and novobiocin in proportions of isonovobiocin to novobiocin greater than 0.5.

4. Process for isomerizing isonovobiocin which comprises allowing isonovobiocin to stand in aqueous alkaline solution until substantial isomerization is effected, said solution initially containing less novobiocin than the equilibrium mixture of novobiocin and isonovobiocin.

5. A process for the isomerization of isonovobiocin which comprises preparing a solution of isonovobiocin in aqueous alkali having a pH between pH 9.5 and pH 11.0 and containing less than two parts of novobiocin for each part of isonovobiocin, and allowing the solution to stand at a temperature between 15 and 35 degrees centigrade until substantial isomerization of isonovobiocin to novobiocin takes place.

6. The process which comprises washing crude novobiocin crystals with aqueous acetone containing from about 55 to eighty volume parts of acetone whereby the wash waters contain a mixture of novobiocin and isonovobiocin in a ratio of less than one, preparing an aqueous solution containing said mixture having a pH of between about pH 9.5 and pH 11.0, and allowing said solution to stand at a temperature of 15 to 35 degrees centigrade until the mixture has a ratio of novobiocin to isonovobiocin of greater than one and then recovering novobiocin therefrom.

7. A process for isomerizing isonovobiocin which comprises allowing isonovobiocin to stand in aqueous alkaline solution until substantial isomerization is effected, said solution initially containing less than two parts novobiocin for each part of isonovobiocin.

8. A process for isomerizing isonovobiocin which comprises allowing isonovobiocin to stand in aqueous alkaline solution at a pH of between pH 9.5 and pH 11.0 until substantial isomerization is effected, said solution initially containing less than two parts novobiocin for each part of isonovobiocin.

References Cited in the file of this patent

Hoeksema et al: Antibiotics and Chemotherapy, February 1956, vol. VI, pp. 143–148.